US012269291B2

(12) United States Patent
Nuccio

(10) Patent No.: US 12,269,291 B2
(45) Date of Patent: Apr. 8, 2025

(54) SPIN ART STAMP CREATING DEVICE

(71) Applicant: BuyProduct Inc., Bethpage, NY (US)

(72) Inventor: Matthew Nuccio, Farmingdale, NY (US)

(73) Assignee: BuyProduct Inc., Bethpage, NY (US)

( * ) Notice: Subject to any disclaimer, the term of this patent is extended or adjusted under 35 U.S.C. 154(b) by 0 days.

(21) Appl. No.: 18/511,059

(22) Filed: Nov. 16, 2023

(65) Prior Publication Data

US 2024/0190167 A1 Jun. 13, 2024

Related U.S. Application Data

(60) Provisional application No. 63/430,683, filed on Dec. 7, 2022.

(51) Int. Cl.
*B44D 3/22* (2006.01)
*B41K 1/02* (2006.01)

(52) U.S. Cl.
CPC . *B44D 3/22* (2013.01); *B41K 1/02* (2013.01)

(58) Field of Classification Search
CPC . B44D 3/22; B44D 2/002; B44D 5/10; B44D 3/00; B41K 1/02; B41K 1/08; B41K 1/38; B41K 1/40; B05C 9/022; B05D 1/002; B05D 5/06
See application file for complete search history.

(56) References Cited

U.S. PATENT DOCUMENTS 5,134,778 A * 8/1992 MacCarthy ............. B43L 11/06 33/27.11
2011/0195382 A1* 8/2011 Rudell ................... G09B 11/10 434/84
2012/0058269 A1* 3/2012 MacFadyen .......... D06P 1/0016 118/52

* cited by examiner

*Primary Examiner* — Jennifer Bahls
*Assistant Examiner* — Quang X Nguyen
(74) *Attorney, Agent, or Firm* — Carter, DeLuca & Farrell, LLP; Francesco Sardone

(57) ABSTRACT

A spin art stamp creating device includes a tray, a spinner platform, and a stamper. The tray includes a raised shelf therein, wherein the raised shelf includes a centrally-located hole. The spinner platform is configured to be received within the tray. The spinner platform has a central opening, wherein the central opening is configured to receive a ball bearing. The ball bearing defines a central hole which overlies and aligns with the centrally-located hole of the tray. The stamper includes a post configured to be received by both the central hole of the ball bearing and the centrally-located hole of the tray, such that the stamper and the spinner platform are configured to simultaneously rotate within the tray about the ball bearing of the spinner platform.

19 Claims, 9 Drawing Sheets

SPIN ART STAMP CREATING DEVICE

CROSS-REFERENCE TO RELATED APPLICATION

This application claims priority to U.S. Provisional Application Ser. No. 63/430,683, filed on Dec. 7, 2022, which is hereby incorporated by reference in its entirety.

TECHNICAL FIELD

This disclosure relates generally to devices for creating art. More specifically, this disclosure relates to a spin art stamp creating device.

BACKGROUND

Spin art is a form of art in which paint is applied to a canvas which sits atop a spinning platform. Devices used to create spin art are often motorized or require batteries to operate. Additionally, once spin art is created on a canvas, there is no means by which it may be easily transferred to another surface.

Accordingly, there is interest in a manual or non-motorized device to create spin art on a stamper which may then be applied to items of clothing or other surfaces.

SUMMARY

An aspect of this disclosure provides a spin art stamp creating device including a tray, a spinner platform, and a stamper. The tray includes a raised shelf therein, the raised shelf including a first hole. The spinner platform is configured to be received within the tray. The spinner platform includes an opening configured to receive a ball bearing. The ball bearing defines a second hole which overlies and aligns with the first hole of the tray. The stamper has a post configured to be received by both the first hole of the tray and the second hole of the ball bearing, such that the stamper and the spinner platform are configured to simultaneously rotate within the tray about the ball bearing of the spinner platform.

In another aspect of this disclosure, the tray may have a circular configuration defined by a bottom wall and a side wall extending around the bottom wall.

In yet another aspect of this disclosure, the bottom wall of the tray may be convex.

In a further aspect of this disclosure, the stamper may further comprise a stamp platform.

In another aspect of this disclosure, the post and the stamp platform may be fixedly secured together.

In yet another aspect of this disclosure, the raised shelf and the first hole may each be centrally located within the tray.

In a further aspect of this disclosure, the opening may be centrally located on the spinner platform.

In another aspect of this disclosure, the ball bearing may be secured into the spinner platform by press-fit.

An aspect of this disclosure provides a spin art stamp creating device including a tray and a stamper. The tray includes a first hole. The stamper includes a post configured to be received by the first hole of the tray such that the stamper is configured to rotate within the tray about a central axis of the stamper.

In another aspect of this disclosure, the spin art stamp creating device may further comprise a ball bearing. The ball bearing may define a second hole which overlies and aligns with the first hole of the tray. The post of the stamper may be configured to be received by both the first hole of the tray and the second hole of the ball bearing, such that the stamper is configured to rotate within the tray about the ball bearing.

In yet another aspect of this disclosure, the spin art stamp creating device may further comprise a spinner platform configured to be received within the tray. The spinner platform may include an opening configured to receive the ball bearing. The stamper and the spinner platform may be configured to simultaneously rotate within the tray about the ball bearing of the spinner platform.

In a further aspect of this disclosure, the opening may be centrally located on the spinner platform.

In another aspect of this disclosure, the ball bearing may be secured into the spinner platform by press-fit.

In yet another aspect of this disclosure, the tray may have a circular configuration defined by a bottom wall and a side wall extending around the bottom wall.

In a further aspect of this disclosure, the bottom wall of the tray may be convex.

In another aspect of this disclosure, the stamper may further comprise a stamp platform.

In yet another aspect of this disclosure, the post and the stamp platform may be fixedly secured together.

In a further aspect of this disclosure, the tray may include a raised shelf therein. The raised shelf may include the first hole.

In another aspect of this disclosure, the raised shelf and the first hole may each be centrally located within the tray.

An aspect of this disclosure provides a method of creating a spin art stamp. The method of creating a spin art stamp includes placing a stamper atop a spinner platform of a spin art stamp creating device, spinning the stamper and the spinner platform within the tray, streaming paint onto the stamper, stopping the stamper and spinner platform from spinning, removing the stamper from the spinner platform, and pressing the stamper onto a garment such that when the stamper is removed from the garment, an impression in the shape of the stamper is left in paint on the garment. The spinner platform includes a ball bearing having a first hole. The spinner platform is received within a tray having a second hole, such that the ball bearing overlies and aligns with the second hole of the tray. The stamper includes a post configured to be received by both the first hole of the ball bearing and the second hole of the tray, such that the stamper and the spinner platform are configured to rotate within the tray about the ball bearing of the spinner platform.

The details of one or more aspects of this disclosure are set forth in the accompanying drawings and the description below. Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate aspects of the disclosure and, together with a general description of the disclosure given above and the detailed description given below, serve to explain the principles of the disclosure, wherein.

DETAILED DESCRIPTION

Figure 1A:
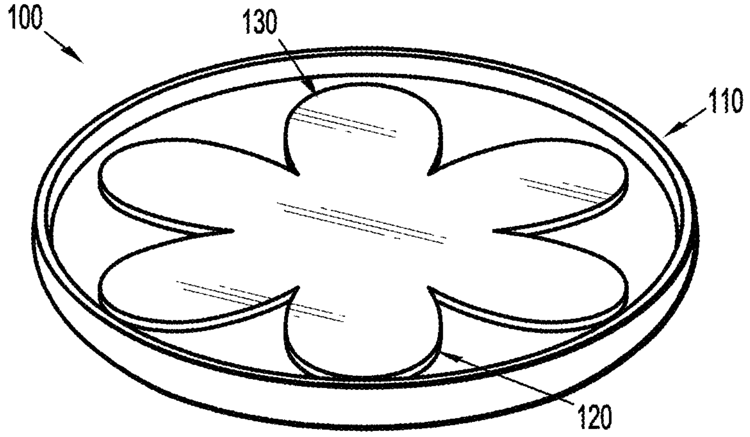
FIG. 1A is a perspective view of the spin art stamp creating device in accordance with this disclosure, including a stamper.

Aspects of this disclosure are described in detail concerning the drawings, in which like reference numerals designate identical or corresponding elements in each of the several views.

Although this disclosure will be described in terms of specific aspects and examples, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the novel features illustrated herein, and any additional applications of the principles of this disclosure as illustrated herein, which would occur to one skilled in the relevant art and having possession of this disclosure, are to be considered within the scope of this disclosure.

Figure 1B:
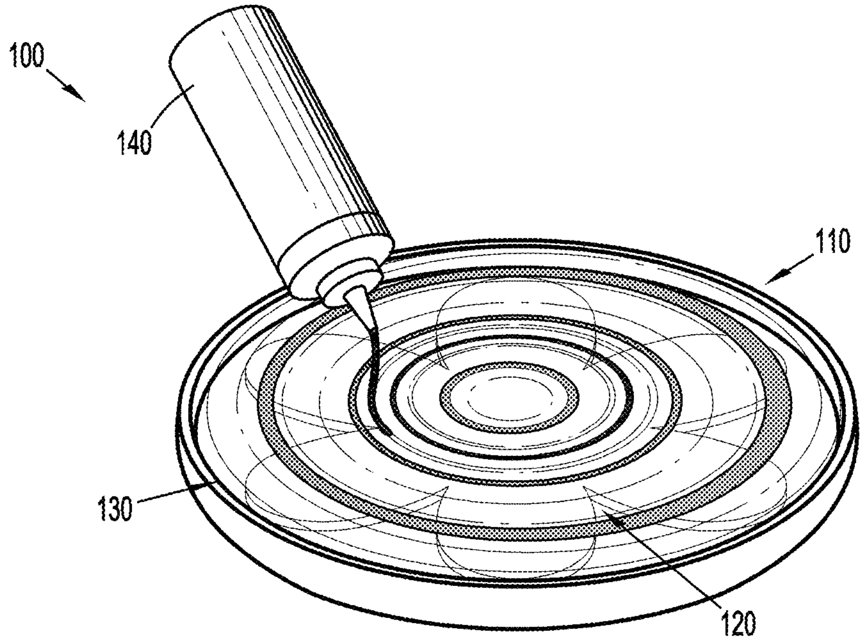
FIG. 1B is a perspective view of the spin art stamp creating device in accordance with this disclosure, showing paint being applied to the stamper.
Figure 1C:
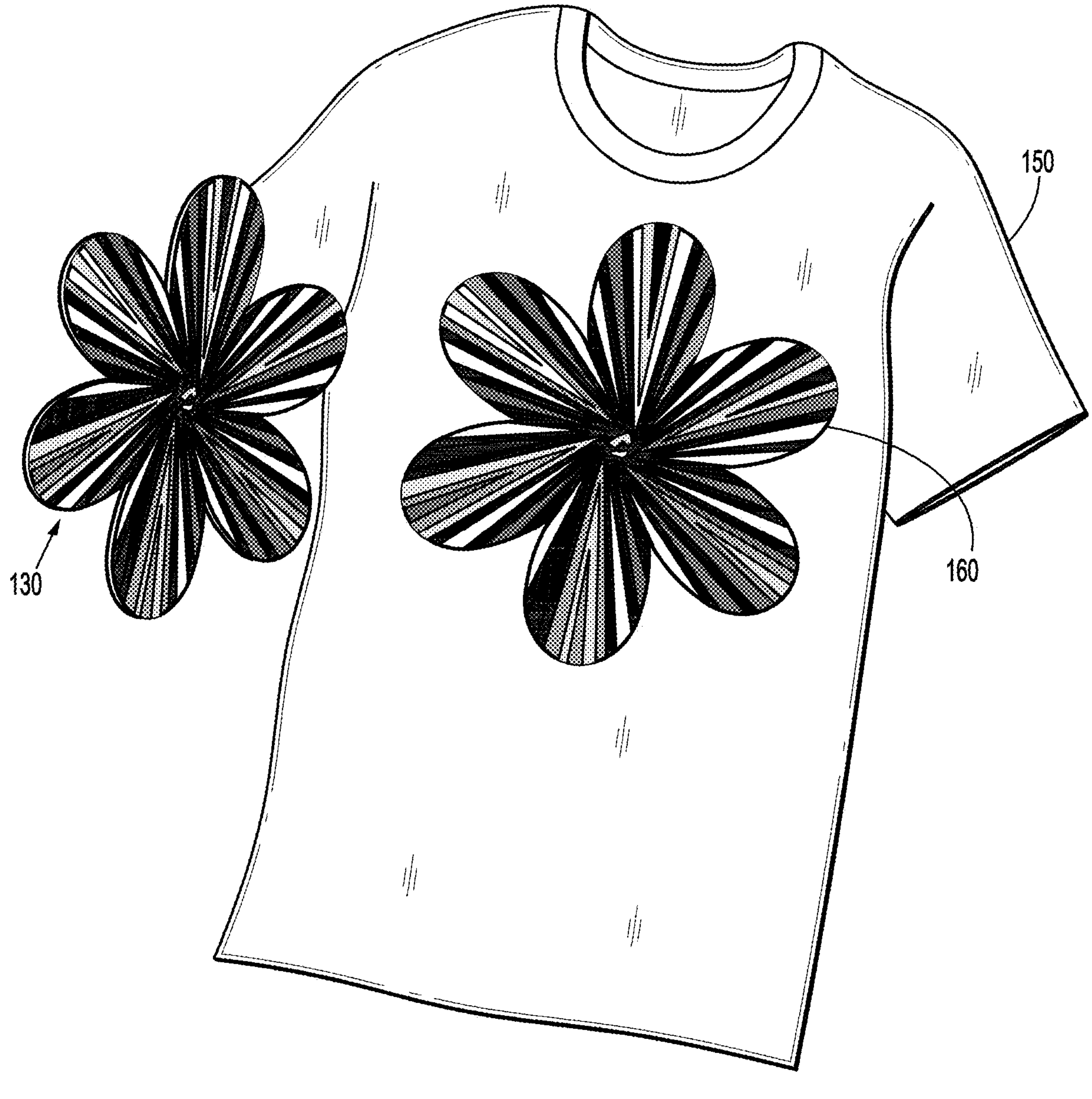
FIG. 1C is a perspective view of the paint-covered stamper making an impression on an item of clothing in accordance with this disclosure.

Referring generally to FIGS. 1A through 1C, a device for producing a stamp made of paint for application to garments, such as t-shirts, and the like, is provided. More specifically, a spin art stamp creating device 100 is provided for use with paint 140 (e.g., dye, ink or the like) to create a stamper 130 which, after being covered with paint 140, is then pressed or touched against a garment 150 (e.g., t-shirt, jacket, pants, etc.) to create a stamp impression 160 of paint 150 onto garment 150 in the shape of stamper 130.

Figure 2:
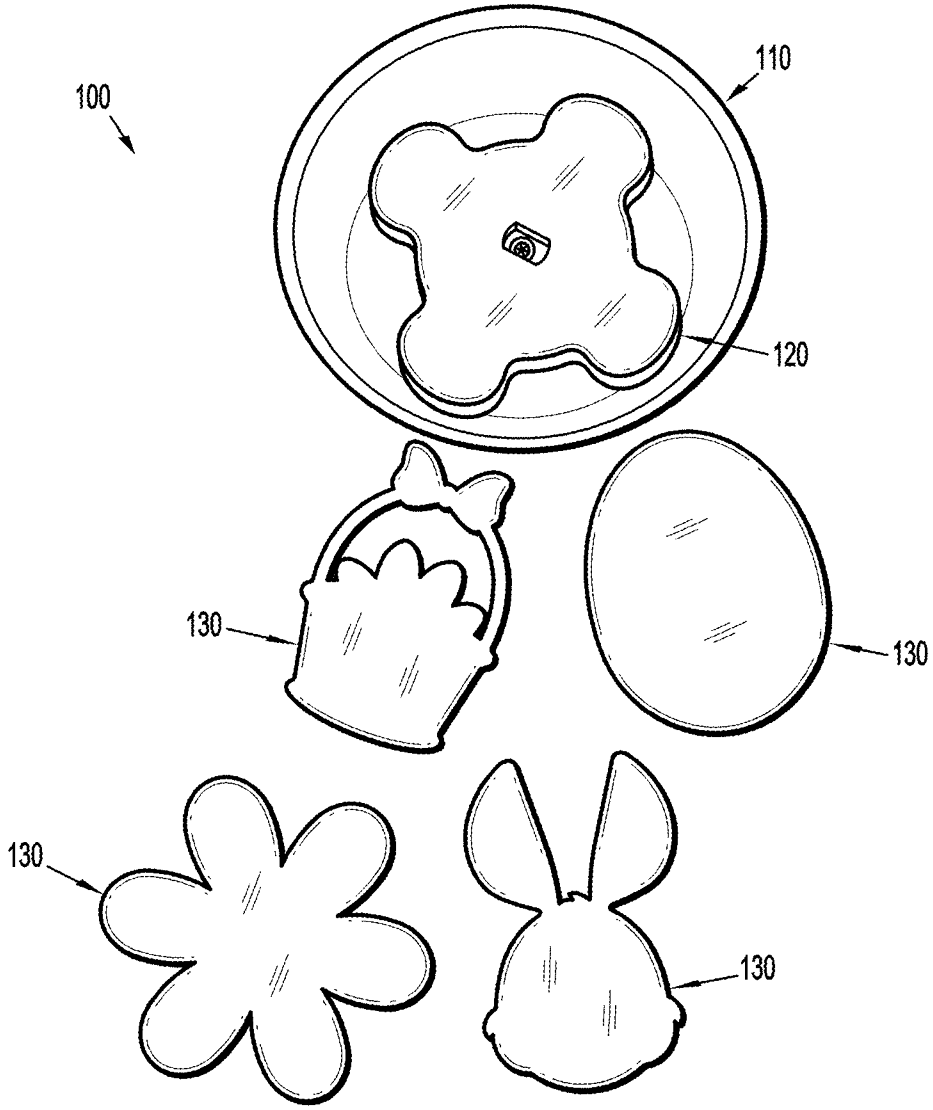
FIG. 2 is a perspective view of the spin art stamp creating device in accordance with this disclosure, showing the stamper removed from a tray and a spinner platform.

Spin art stamp creating device 100 with stamper 130 removed is displayed in FIG. 2. Spin art stamp creating device 100 may include a tray 110 (e.g., tub) and a spinner platform 120 received within tray 110. Spin art stamp creating device 100 includes a stamper 130 which may be removably received by spinner platform 120 and disposed within tray 110.

Figure 3A:
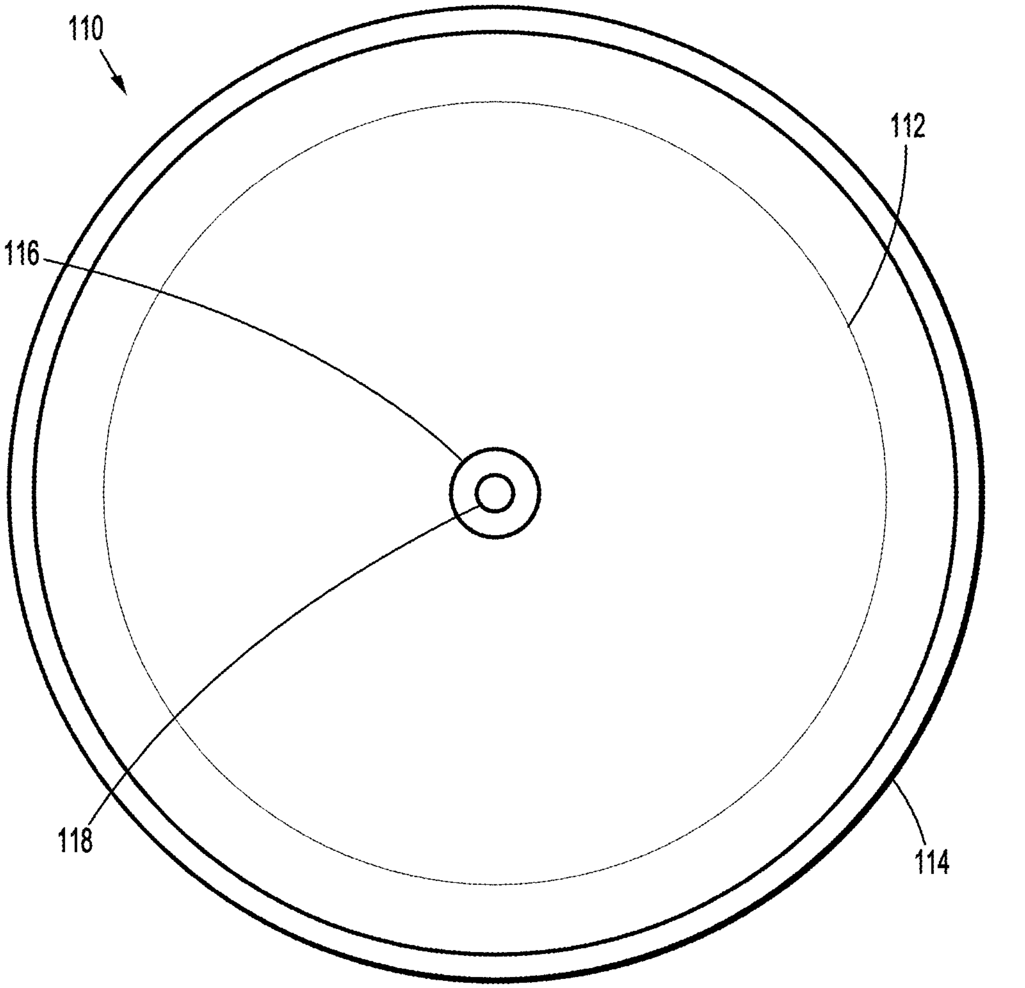
FIG. 3A is a top view of the tray of the spin art stamp creating device in accordance with this disclosure.
Figure 3B:
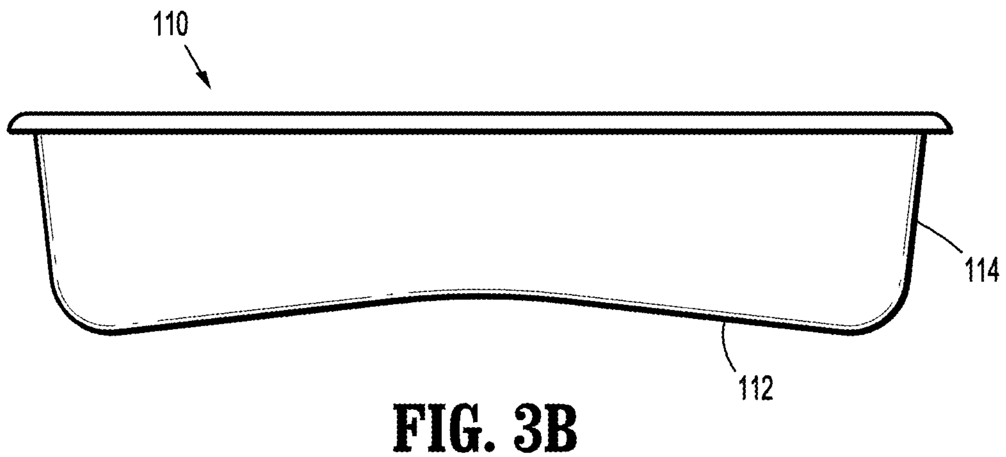
FIG. 3B is a side view of the tray of the spin art stamp creating device in accordance with this disclosure.

Referring now to FIGS. 3A and 3B, tray 110 of spin art stamp creating device 100 is shown having a circular configuration defined by a bottom wall 112 and a side wall 114 extending around bottom wall 112. While tray 110 shown is circular, it is contemplated that any shaped tray 110 may be used. For example, rectangular, square, triangular, or any other shape that may be desired. Bottom wall 112 of tray 110 may be convex, or may taper upwardly, thereby defining a raised central shelf 116. Central shelf 116 may define a central shelf hole 118 therein.

Tray 110 may be made of plastic, rubber, silicone, paper, cardboard, metal or the like.

Figure 4A:
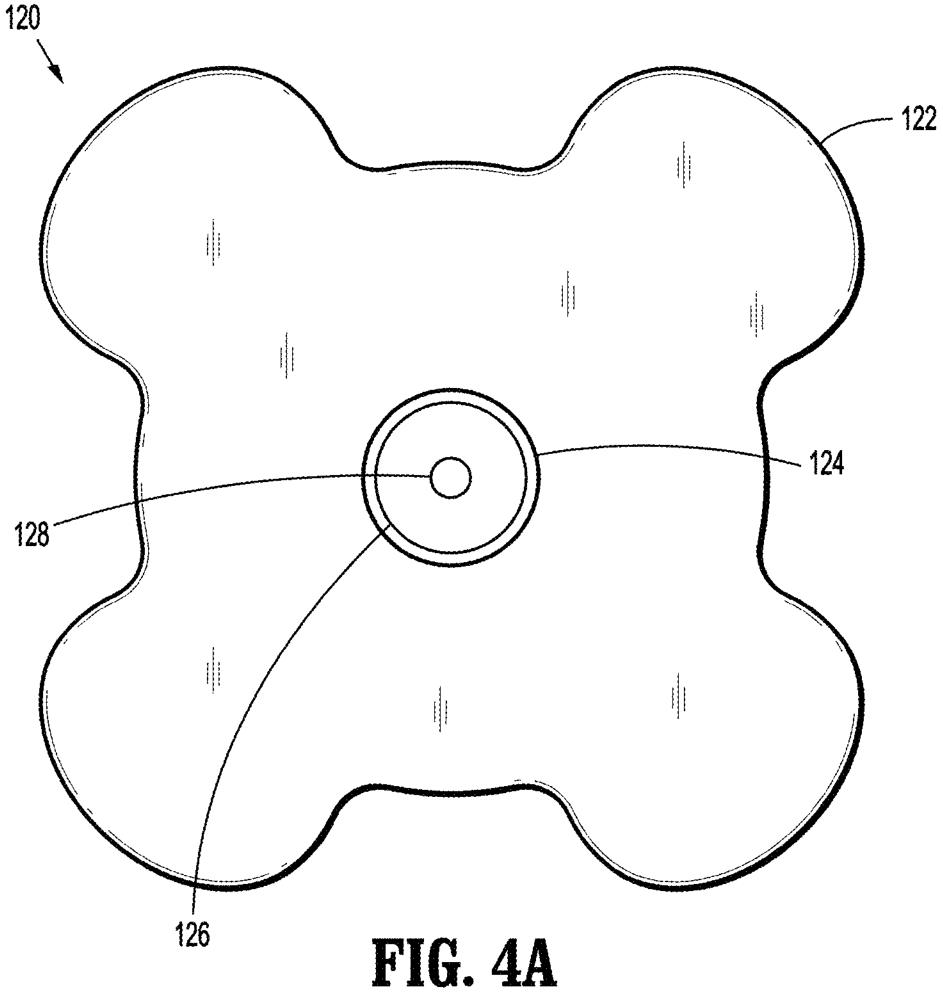
FIG. 4A is a top view of a spinner platform of the spin art stamp creating device in accordance with this disclosure.
Figure 4B:
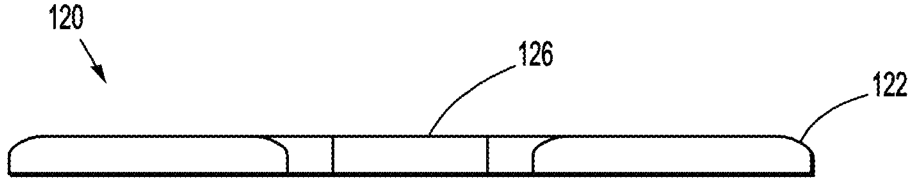
FIG. 4B is a side view of the spinner platform of the spin art stamp creating device in accordance with this disclosure.
Figure 5A:
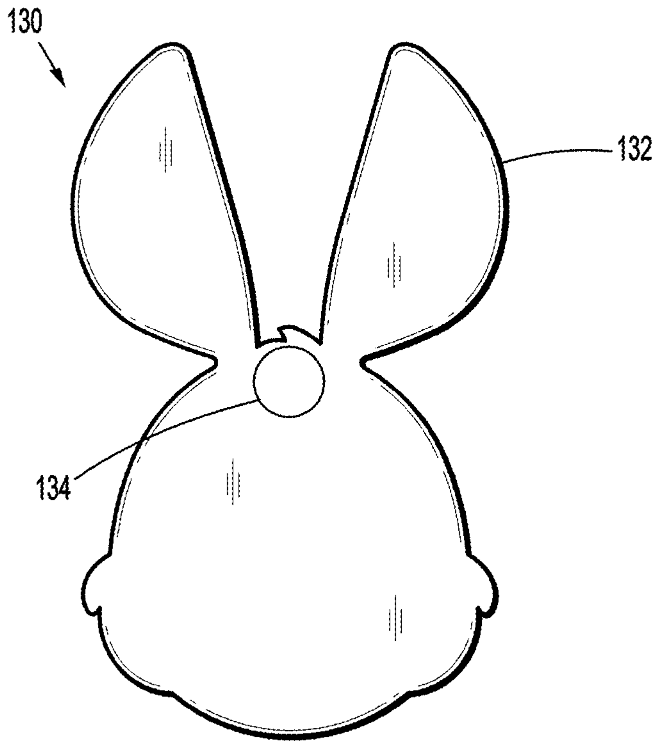
FIG. 5A is a top view of one aspect of the stamper of the spin art stamp creating device in accordance with this disclosure.
Figure 5B:
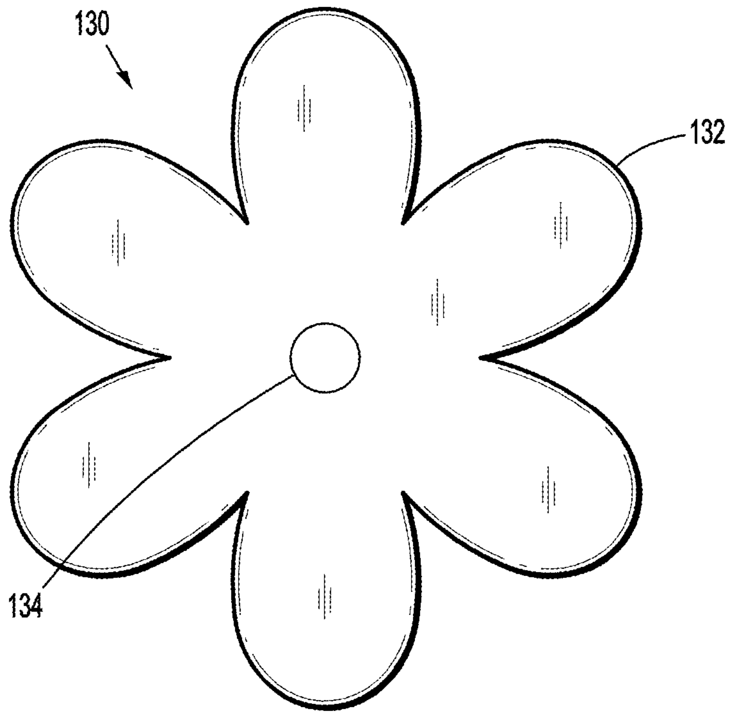
FIG. 5B is a top view of another aspect of the stamper of the spin art stamp creating device in accordance with this disclosure.
Figure 5C:
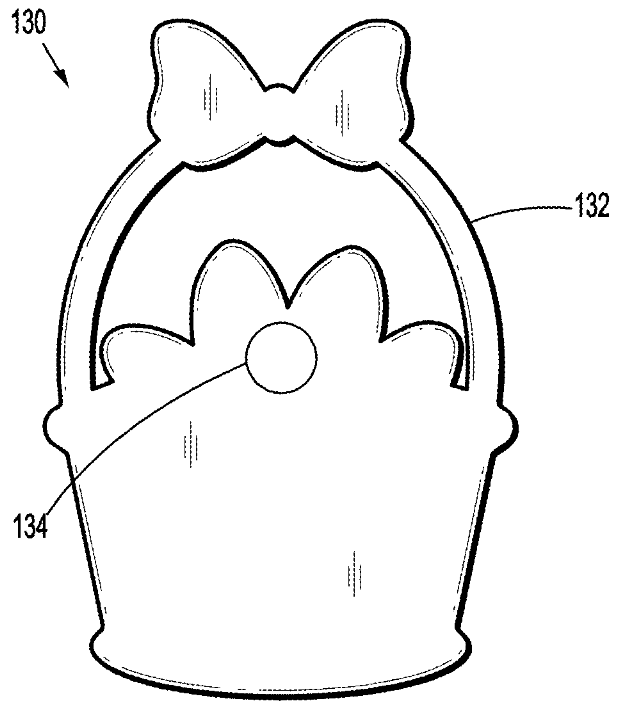
FIG. 5C is a top view of yet another aspect of the stamper of the spin art stamp creating device in accordance with this disclosure.
Figure 5D:
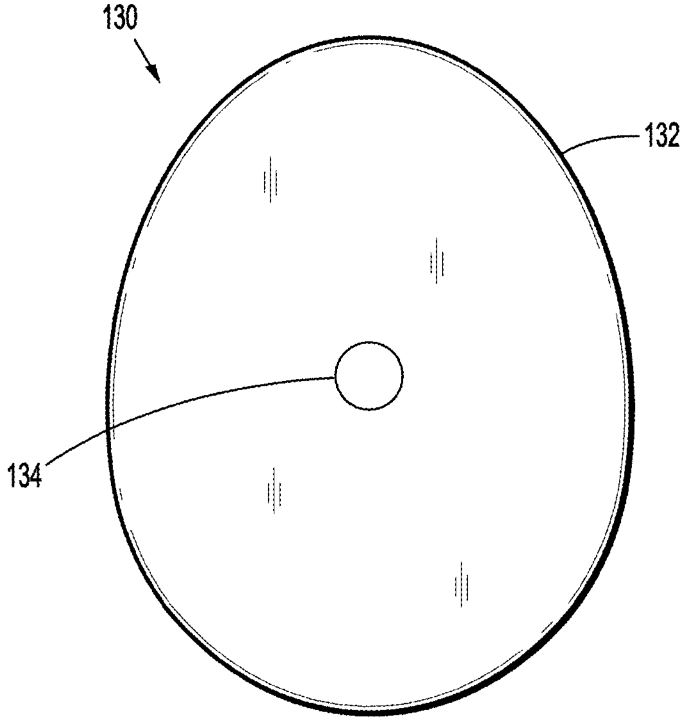
FIG. 5D is a top view of a further aspect of the stamper of the spin art stamp creating device in accordance with this disclosure.
Figure 5E:
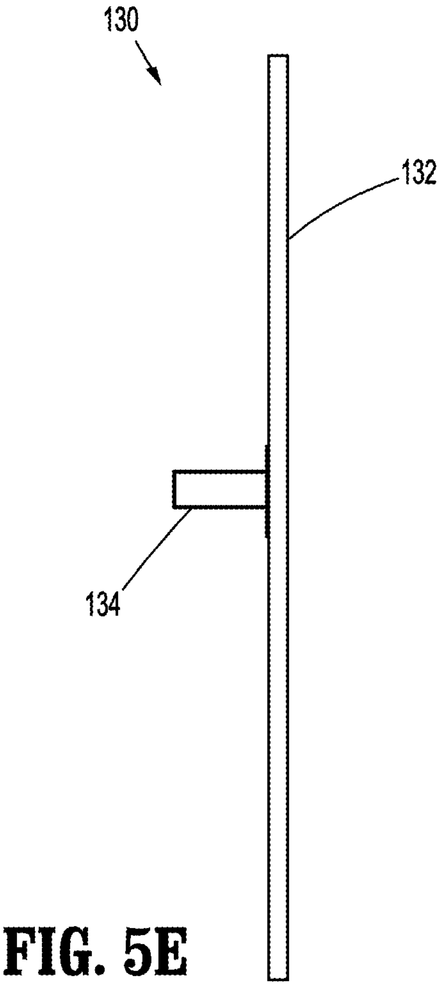
FIG. 5E is a side view of the stamper of the spin art stamp creating device in accordance with this disclosure.

As shown in FIGS. 4A and 4B, spinner platform 120 of spin art stamp creating device 100 may further include a spinner board 122 sized and shaped to be received within tray 110, and specifically within the dimensions defined by side wall 114 of tray 110. Spinner platform 120 includes a central opening 124 formed therein. Spinner platform 120 includes a ball bearing 126 secured within central opening 124 of spinner platform 120. Ball bearing 126 is secured by a press-fit, by adhering, by welding, or by being injection molded into spinner platform 120. Specifically, an outer race of ball bearing 126 is retained in central opening 124 of spinner platform 120 in such a manner so as to not rotate within central opening 124 while an inner race of ball bearing 126 is free to rotate relative to the outer race. Ball bearing 126 defines a central hole 128 which is sized to match central shelf hole 118 of bottom wall of tray 110.

Figure 7:
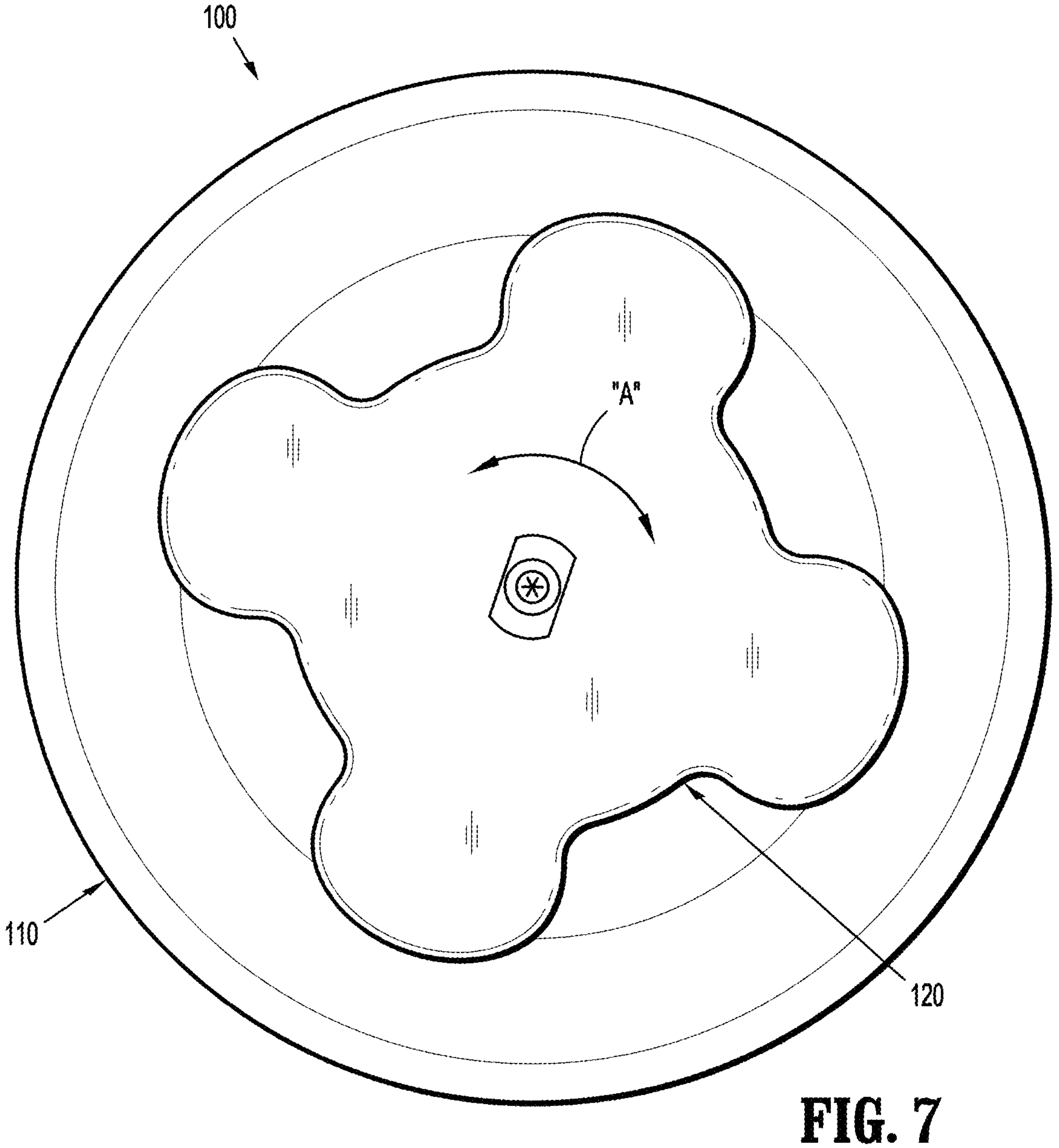
FIG. 7 is a perspective view of the spin art stamp creating device in accordance with this disclosure, showing the stamper removed from the tray and the spinner platform, and showing the manner in which the spinner platform rotates within the tray.

In use, spinner platform 120 is placed within tray 110 such that central hole 128 of ball bearing 126 of the spinner platform 120 overlies and aligns with central shelf hole 118 of tray 110. Once so positioned, spinner platform 120 may be spun (manually) relative to tray 110 so as to rotate about a central axis of ball bearing 126 (FIGS. 1A, 1B, 7).

Figure 6A:
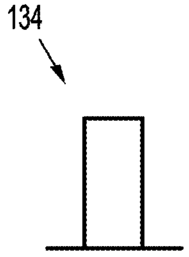
FIG. 6A is a side view of the post of the stamper of the spin art stamp creating device in accordance with this disclosure.
Figure 6B:
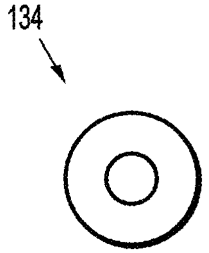
FIG. 6B is a top view of the post of the stamper of the spin art stamp creating device in accordance with this disclosure.

Referring to FIGS. 5A through 5E, stamper 130 of spin art stamp creating device 100 may include a stamp platform 132 and a stem 134 (e.g., post) extending from stamp platform 132. Stamp platform 132 may have any desired or contemplated shape or outline. Stem 134 may be glued or sonically welded to stamp platform 132, or fixedly connected to one another according to any method known by one skilled in the art. In aspects, stem 134 may be secured to stamp platform 132 by a press-fit, such that a single stem 134 may be coupled with interchangeable stamp platforms 132. Stem 134 is shown in FIGS. 6A and 6B. Stem 134 is sized and shaped so as to be receivable within central hole 128 of ball bearing 126 of spinner platform 120 and central shelf hole 118 of tray 110.

In use, stamper 130 is placed on spinner platform 120, either before or after spinner platform 120 is placed in tray 110, such that stem 134 of stamper 130 is inserted into central hole 128 of ball bearing 126 of spinner platform 120 and central shelf hole 118 of tray 110.

In aspects, spin art stamp creating device 100 comprises tray 110 and stamper 130. Stem 134 may be received directly within central shelf hole 118 of central shelf 116.

Central shelf hole 118 may be sized such that stamper 130 may freely rotate about a central axis of stem 134 within central shelf hole 118, thus allowing stamper 130 to be manually spun relative to tray 110.

To make a stamp impression 160, while stamper 130 is located on spinner platform 120 within tray 110, spinner platform 120, and thus stamper 130, is spun. Spinner platform 120 and stamper 130 may be spun manually. While spinner platform 120 and stamper 130 are spinning (as indicated by double-headed arrow "A" in FIG. 7), a user can drizzle or pour or stream paint 140 onto stamp platform 132 of stamper 130. If repeated spinning is necessary, the user can re-spin spinner platform 132 and continue to add paint 140. When the user is satisfied, and spinner platform 132 is stopped from spinning, stamper 130 is lifted off of spinner platform 120 and out of tray 110, and stamper 130 is brought to a garment 150. The side of stamper 130 containing the paint 140 is placed down onto or pressed into garment 150 to thereby transfer paint 140 onto garment 150, creating a stamp impression 160 in the shape of stamper 130. In addition to, or instead of, being placed down onto or pressed into garment 150, the side of stamper 130 containing paint 140 may be placed down or pressed onto a bag, a blanket, a canvas, or the like.

The process may be repeated many times over, with the same or another stamper 130, either on the same garment 150, bag, blanket, canvas or on a new garment 150, bag, blanket, canvas. When the user wishes to cease use of spin art stamp creating device 100, spinner platform 120 may be removed from tray 110 and excess paint 140 may be easily removed from tray 110, spinner platform 120, and stamper 130.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It will be understood that various modifications may be made to the aspects described by the present disclosure. Therefore, the above description should not be construed as limiting, but merely as exemplifications of various aspects. Those skilled in the art will envision other modifications within the scope and spirit of the present disclosure.

What is claimed is:

1. A spin art stamp creating device, comprising:

a tray, having a raised shelf therein, the raised shelf including a first hole;

a spinner platform configured to be received within the tray, wherein:

the spinner platform includes an opening, the opening of the spinner platform is configured to receive a ball bearing, and the ball bearing defines a second hole which overlies and aligns with the first hole of the tray; and a stamper, having a post configured to be received by both the first hole of the tray and the second hole of the ball bearing, such that the stamper and the spinner platform are configured to simultaneously rotate within the tray about the ball bearing of the spinner platform.

2. The spin art stamp creating device of claim 1, wherein the tray has a circular configuration defined by a bottom wall and a side wall extending around the bottom wall.

3. The spin art stamp creating device of claim 2, wherein the bottom wall of the tray is convex.

4. The spin art stamp creating device of claim 1, wherein the stamper further comprises a stamp platform.

5. The spin art stamp creating device of claim 4, wherein the post and the stamp platform are fixedly secured together.

6. The spin art stamp creating device of claim 1, wherein the raised shelf and the first hole are each centrally located within the tray.

7. The spin art stamp creating device of claim 1, wherein the opening is centrally located on the spinner platform.

8. The spin art stamp creating device of claim 1, wherein the ball bearing is secured into the spinner platform by press-fit.

9. A spin art stamp creating device, comprising:

a tray including a first hole;

a stamper, having a post configured to be received by the first hole of the tray such that the stamper is configured to rotate within the tray about a central axis of the stamper; and a ball bearing, wherein:

the ball bearing defines a second hole which overlies and aligns with the first hole of the tray, and the post of the stamper is configured to be received by both the first hole of the tray and the second hole of the ball bearing, such that the stamper is configured to rotate within the tray about the ball bearing.

10. The spin art stamp creating device of claim 9, further comprising a spinner platform configured to be received within the tray, wherein:

the spinner platform includes an opening, the opening of the spinner platform is configured to receive the ball bearing, and the stamper and the spinner platform are configured to simultaneously rotate within the tray about the ball bearing of the spinner platform.

11. The spin art stamp creating device of claim 10, wherein the opening is centrally located on the spinner platform.

12. The spin art stamp creating device of claim 10, wherein the ball bearing is secured into the spinner platform by press-fit.

13. The spin art stamp creating device of claim 9, wherein the tray has a circular configuration defined by a bottom wall and a side wall extending around the bottom wall.

14. The spin art stamp creating device of claim 13, wherein the bottom wall of the tray is convex.

15. The spin art stamp creating device of claim 9, wherein the stamper further comprises a stamp platform.

16. The spin art stamp creating device of claim 15, wherein the post and the stamp platform are fixedly secured together.

17. The spin art stamp creating device of claim 9, wherein:

the tray includes a raised shelf therein, and the raised shelf includes the first hole.

18. The spin art stamp creating device of claim 17, wherein the raised shelf and the first hole are each centrally located within the tray.

19. A method of creating a spin art stamp, comprising:

placing a stamper atop a spinner platform of a spin art stamp creating device, wherein:

the spinner platform includes a ball bearing having a first hole, the spinner platform is received within a tray having a second hole, such that the ball bearing overlies and aligns with the second hole of the tray, the stamper includes a post configured to be received by both the first hole of the ball bearing and the second hole of the tray, such that the stamper and the spinner platform are configured to rotate within the tray about the ball bearing of the spinner platform;

spinning the stamper and the spinner platform within the tray;

streaming paint onto the stamper;

stopping the stamper and spinner platform from spinning;

removing the stamper from the spinner platform; and pressing the stamper onto a garment such that when the stamper is removed from the garment, an impression in the shape of the stamper is left in paint on the garment.

* * * * *